(12) United States Patent
Jhuang

(10) Patent No.: US 7,366,527 B2
(45) Date of Patent: Apr. 29, 2008

(54) COMMUNICATION DEVICE FOR TRANSMITTING/ACQUIRING A PHONE NUMBER VIA A LINK NETWORK AND METHOD THEREOF

(75) Inventor: Yun-Shiang Jhuang, Taipei (TW)

(73) Assignee: Inventec Multimedia&Telecom Corporation, Taipei (TW)

( * ) Notice: Subject to any disclaimer, the term of this patent is extended or adjusted under 35 U.S.C. 154(b) by 353 days.

(21) Appl. No.: 11/209,665

(22) Filed: Aug. 24, 2005

(65) Prior Publication Data

US 2007/0049298 A1 Mar. 1, 2007

(51) Int. Cl.
*H04Q 7/20* (2006.01)

(52) U.S. Cl. .................. 455/458; 455/406; 455/414.1; 455/415; 455/459; 379/88.21; 379/88.2; 379/142.02

(58) Field of Classification Search ............... 455/406, 455/414.1, 415, 459, 458; 379/88.2, 88.21, 379/142.02
See application file for complete search history.

(56) References Cited

U.S. PATENT DOCUMENTS

| | | | |
|---|---|---|---|
| 6,505,055 B1 * | 1/2003 | Kahn et al. ................. | 455/564 |
| 7,085,809 B2 * | 8/2006 | Mori et al. ................. | 709/203 |
| 2002/0184318 A1 * | 12/2002 | Pineau ....................... | 709/206 |
| 2003/0013414 A1 * | 1/2003 | Huang et al. ................ | 455/41 |
| 2003/0081758 A1 * | 5/2003 | Kumar et al. ............. | 379/355.03 |
| 2004/0097218 A1 * | 5/2004 | Vossler ...................... | 455/418 |
| 2006/0052091 A1 * | 3/2006 | Onyon et al. ............... | 455/415 |
| 2007/0016362 A1 * | 1/2007 | Nelson ....................... | 701/200 |
| 2007/0054550 A1 * | 3/2007 | Cuthbert et al. ............ | 439/607 |

* cited by examiner

*Primary Examiner*—Steve M. D'Agosta
(74) *Attorney, Agent, or Firm*—Harness, Dickey & Pierce, P.L.C.

(57) ABSTRACT

A communication device for transmitting/acquiring a phone number via a link network and method thereof are provided. In an embodiment, two communication devices are linked together via a link network to directly transfer a phone number stored in a communication device to the other via the link network. Further, the communication device receiving the phone number, can make a comparison according to a decision table to determine whether it is a diallable phone number, thereby providing a dial function or an edit confirm option for the received the phone number. In this case, the decision table has multiple identification numbers and their corresponding number counts.

16 Claims, 5 Drawing Sheets

COMMUNICATION DEVICE FOR TRANSMITTING/ACQUIRING A PHONE NUMBER VIA A LINK NETWORK AND METHOD THEREOF

BACKGROUND

1. Field of Invention

The present invention relates to a phone number transmission/acquisition mechanism of a communication device, and more particularly, relates to a communication device for transmitting/acquiring a phone number via a link network and method thereof.

2. Related Art

As the rapid development of the electronic industry, the high-tech products, such as computers, cell phones, Personal Digital Assistants (PDA) are also developed quickly. As the development of the technology, the communication methods between people are diversified, such as, local phones, mobile phones, and IP phones. Conventionally, people always contact with each other with indoor phones and at this circumstance, the phone numbers of all friends and relatives are all recorded in a paper phone book by writing. However, as the development of humanization and diversification, the current local phones are provided with the ability of temporarily registering a few of history calls, storing a few of phone numbers, and the like. Additionally, the emergence of mobile phones facilitates the more convenient and rapid communications between people, and the phonebook of the mobile phone with a large storage capacity of phone numbers has gradually replaced the paper phone books. In addition, during the recent years, as the development of network technology and consumption demands, the IP phones are developed, which enable users to communicate with others via networks. Since this kind of communication device is used for speech communication by linking to the network, there is no burden of telecommunication expense, which is different from the indoor phones and mobile phones. Therefore, it has gradually become one of the main communication devices in daily life.

However, since each of these communication devices has its advantages and disadvantages, any one of them cannot totally replace others. But the phone books of these communication devices are not in sync; the user still needs to turn to phone books of other communication devices. Particularly, due to the mobility of the mobile phone, the user currently records the contact information of friends and relatives in the phone book of the mobile phone. Since generally the mobile phone is the one with the highest telecommunication cost among all the communication devices, if there is another communication device available, another communication device will be used to make a phone call referring to the phone books of the mobile phones. Therefore, a simple way is desired to enable the user to transmit the desired phone number from any one of the communication devices to another communication device directly, and then make a call by another communication device, which provides convenience for using the communication devices.

SUMMARY

In view of the above problems, the main object of the present invention is to provide a communication device for transmitting/acquiring a phone number via a link network and method thereof to eliminate the problems disclosed in the prior art Accordingly, to achieve the above-mentioned object, the communication device for transmitting/acquiring a phone number via a link network disclosed in the present invention comprises a storage medium, a user interface, and a signal transceiver. The storage medium is provided with a phone number record list to record multiple phone numbers, a user interface to select one or more phone numbers, and a signal transceiver to detect the available link network, such that the selected phone number is transmitted to another communication device by linking to the network via a link network, wherein the link network for transferring the phone number can be selected from the detected link networks by the user interface.

Furthermore, the another communication device is provided with a signal transceiver, which can provide the above-mentioned link network, such that the transferred phone number can be received via the link network; then the received phone number can be recorded on a phone number record list in the storage medium; and the dial and edit functions of a phone number are provided by a controller. Herein, another communication device further comprises a display to display a frame showing a phone number and the corresponding dial option of this phone number.

Herein, the signal transceivers of the two communication devices are the link interfaces linked with each other by a transmission line; or the infrared modules linked with each other by infrared rays; or wireless transceiver modules (e.g., RF transceiver modules, Bluetooth wireless transceiver modules, Wireless Local Area Network (WLAN) transceiver modules, or wireless transceiver modules of the same series as the 802.11x Standard instituted by the International Electrical and Electronics Engineers Institute (IEEE) (e.g., 802.11a Standard, 802.11b Standard, 802.11g Standard, 802.11h Standard, 802.11i Standard, or the one containing more than two Standards of 802.11 series, etc.)) which can be linked with each other.

The present invention further discloses a communication device for acquiring a phone number via a link network, comprising a signal transceiver, a storage medium, a determining part, and a controller. The signal transceiver can provide a link network, and acquire a phone number of another communication device through this link network. Then, the received phone number is recorded on a phone number record list in the storage medium. And the determining part determines the properties of the received phone number to obtain an expected dial state of the phone number, and thus providing a determined result. Then controller provides a dial function or an edit function of a phone number according to the determined result.

The determining part makes a comparison of the phone numbers according to a decision table to obtain a determined result. And identification numbers and the corresponding number counts are recorded on the decision table. The identification numbers can be one of the integral codes from 2 to 4 digits, and the number count depend upon the dial state of the communication device.

Herein, when the expecting dial state is determined to be adiallable phone number, the controller provides a dial function; whereas, when the expecting dial state is determined to be an undiallable phone number, the controller provides an edit function.

In addition, a display is further included for showing a frame controlled by the controller, i.e. when the controller provides a dial function, this frame is a pre-dialed frame, and a dial option is provided on the pre-dialed frame; and when the controller provides an edit function, this frame is an edit frame, and an edit confirm option is provided on the edit frame.

Herein, the signal transceivers of the two communication devices can be the link interfaces linked with each other through the transmission line; or the infrared modules linked with each other by infrared rays; or wireless transceiver modules (e.g., RF transceiver modules, Bluetooth wireless transceiver modules, Wireless Local Area Network (WLAN) transceiver modules, or wireless transceiver modules of the same series as the 802.11x Standard instituted by International Electrical and Electronics Engineers Institute (IEEE) (e.g., 802.11a Standard, 802.11b Standard, 802.11g Standard, 802.11h Standard, 802.11i Standard, or the one containing more than two Standards of 802.11 series, etc.)) which can be linked with each other.

The present invention further discloses a method for transmitting a phone number via a link network, which is adapted to a first communication device. The method comprises the following steps: selecting at least one stored phone number; detecting at least one link network, wherein one of the link networks is used to link a first communication device to a second communication device; selecting the link network for linking the first and second communication devices; and transmitting the selected phone number to the second communication device by the selected link network.

Herein, the link network can be an infrared link, or formed by a wireless transceiver module or a transmission line, wherein the selected phone number is recorded on a phone number record list in the first communication device and the phone number record list comprises at least one phone number field.

Further, the second communication device provides a dial function and an edit function for a phone number, after receiving a transferred phone number.

The present invention further discloses a method for acquiring a phone number via a link network, which is adapted to a communication device. The method comprises the following steps: receiving at least one phone number from another communication device via a link network; recording the received phone number on a phone number record list; selecting a link network for link the first and second communication devices; and transferring the selected phone number to the second communication device by the selected link network.

The comparison of one of the phone numbers is carried out according to a decision table to obtain a determined result. And a plurality of identification numbers and the corresponding number counts are recorded on the decision table. The identification numbers can be one of the integral codes from 2 to 4 digits, and the number counts depend upon the dial state of the communication device.

Herein, when the expecting dial state is a diallable phone number, a dial function for the determined phone number is provided; whereas, when the expecting dial state is an undiallable phone number, an edit function for the determined phone number is provided.

In addition, when a dial function for the determined phone number is provided, a pre-dialed frame is displayed on the display, and a dial option is provided on the pre-dialed frame; whereas, when an edit function for the determined phone number is provided, an edit frame is displayed on the display, and an edit confirm option is provided on the edit frame.

The link network can be an infrared link, or formed by a wireless transceiver module or a transmission line.

The characteristics and practice of the present invention are now described below in great detail as the most preferred embodiments with reference to the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
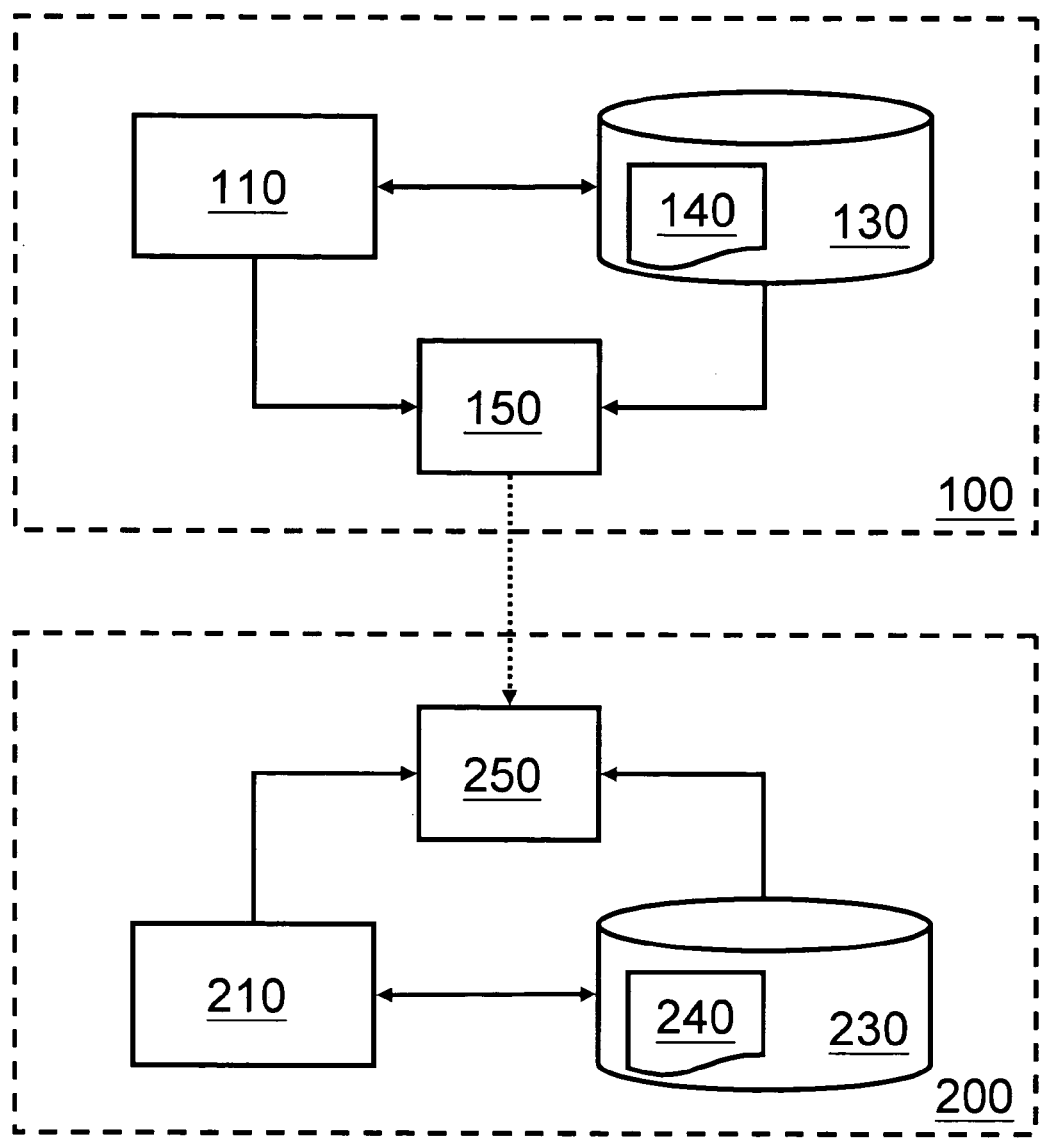
FIG. 1 is a general block diagram for illustrating a communication device for transmitting/acquiring a phone number via a link network according to an embodiment of the present invention.

First, the main concept of the present invention is illustrated, wherein a phone number stored in a communication device is transferred to another communication device by a simple transmission mechanism, such that it is convenient for the user to make a dial, and select the most proper communication system to communicate. It should be stated that, the present invention could be applied to any communication device that performs communicating according to a phone number, e.g., indoor phones, mobile phones, public phones, Personal Digital Assistants (PDA), smart mobile phones, or computers, and the like.

The contents of the present invention are illustrated below with reference to the embodiments, and with the assistant of the drawings. The reference numerals mentioned in the description are those referring to the drawings.

Referring to FIG. 1, a first communication device 100 comprises a first user interface 110, a first storage medium 130, and a first signal transceiver 150.

A phone number record list 140 is created in the storage medium 130, and comprises at least one phone number field. The user can input phone numbers via the first user interface 110, to create a personal phone number list.

Herein, the first user interface 110 mainly comprises a display for displaying various information, and keys for users to carry out various input operations, and further comprises a microphone and a loudspeaker for the user to talk to each other.

Figure 2:
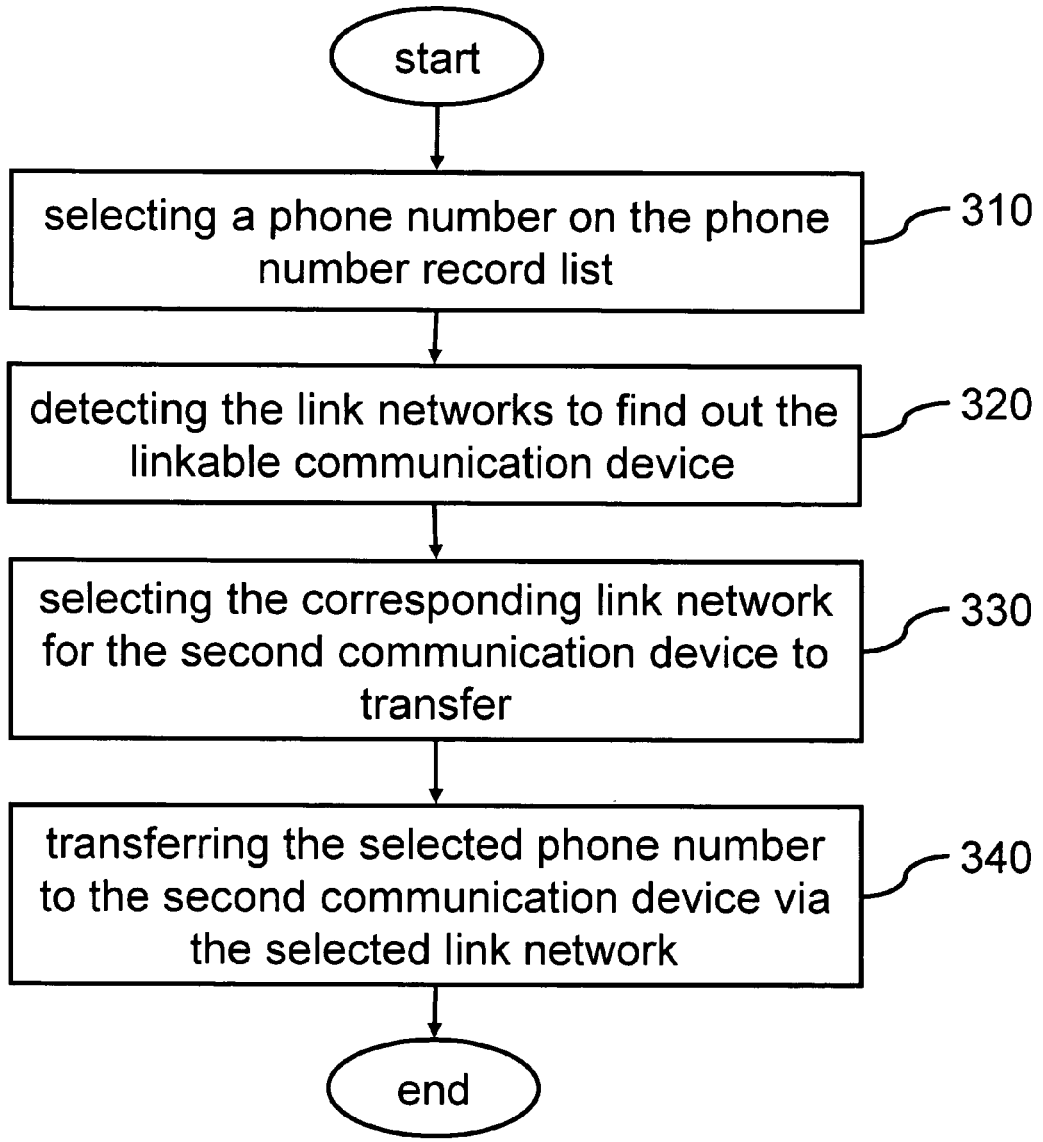
FIG. 2 is a flow chart for illustrating a method for transmitting a phone number via a link network according to an embodiment of the present invention.

Herein, the user selects one or more phone numbers stored in the phone number record list 140 in the first storage medium 130 (Step 310); and a first transceiver 150 is further utilized to detect link networks, to find out an available second communication device 200 (Step 320); and the corresponding link network is selected for the second communication device 200 to transfer (Step 330); and then the user may input a transfer command by the first user interface 110, such that the first transceiver 150 transfers the selected phone number to the second communication device 200 by the selected link network (Step 340), as shown in FIG. 2.

Then, return to FIG. 1, the second communication device 200 comprises a second user interface 210, a second storage medium 230, a second signal transceiver 250, a second determining part 270, and a second controller 290. Also, the second user interface 210 mainly comprises a display for displaying various information and keys for the user to carry out various input operations; and further comprises a microphone and a loudspeaker for the user to talk to each other. Herein, another phone number record list 240 is created in the second storage medium 230, which also comprises at least one phone number fields.

Figure 3:
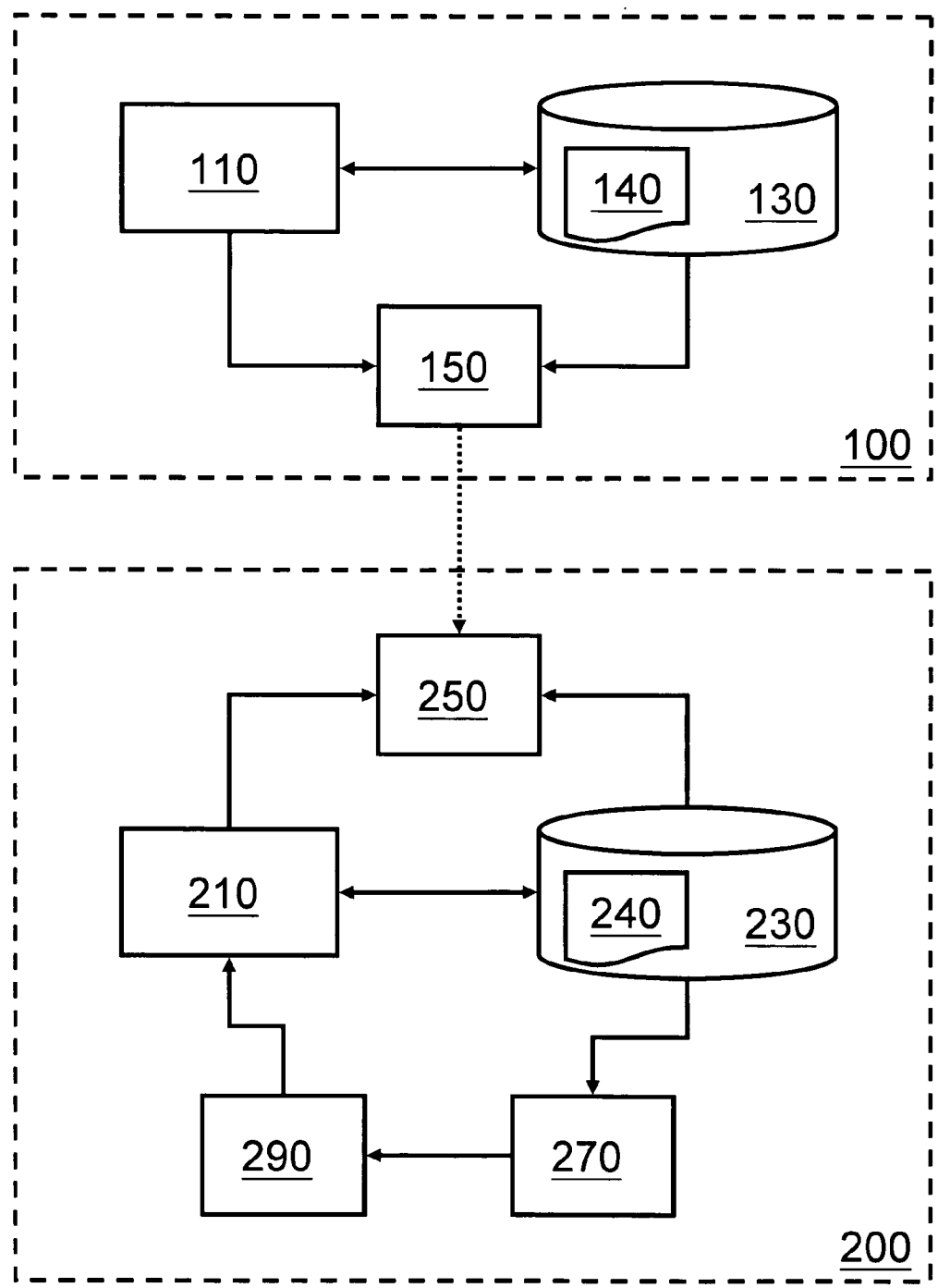
FIG. 3 is a general block diagram for illustrating a communication device for transmitting/acquiring a phone number via a link network according to another embodiment of the present invention.

Herein, the second transceiver 250 after receiving the transferred phone numbers records the received phone numbers on the phone number record list 240. Then, the user can edit the phone number before dialing, or directly dial, as shown in FIG. 3. In other words, a phone number is displayed on the display of the second communication device, and a dial option is also provided. Thus, the user can decide to edit or directly dial by pressing the keys in the second user interface.

Figure 4:
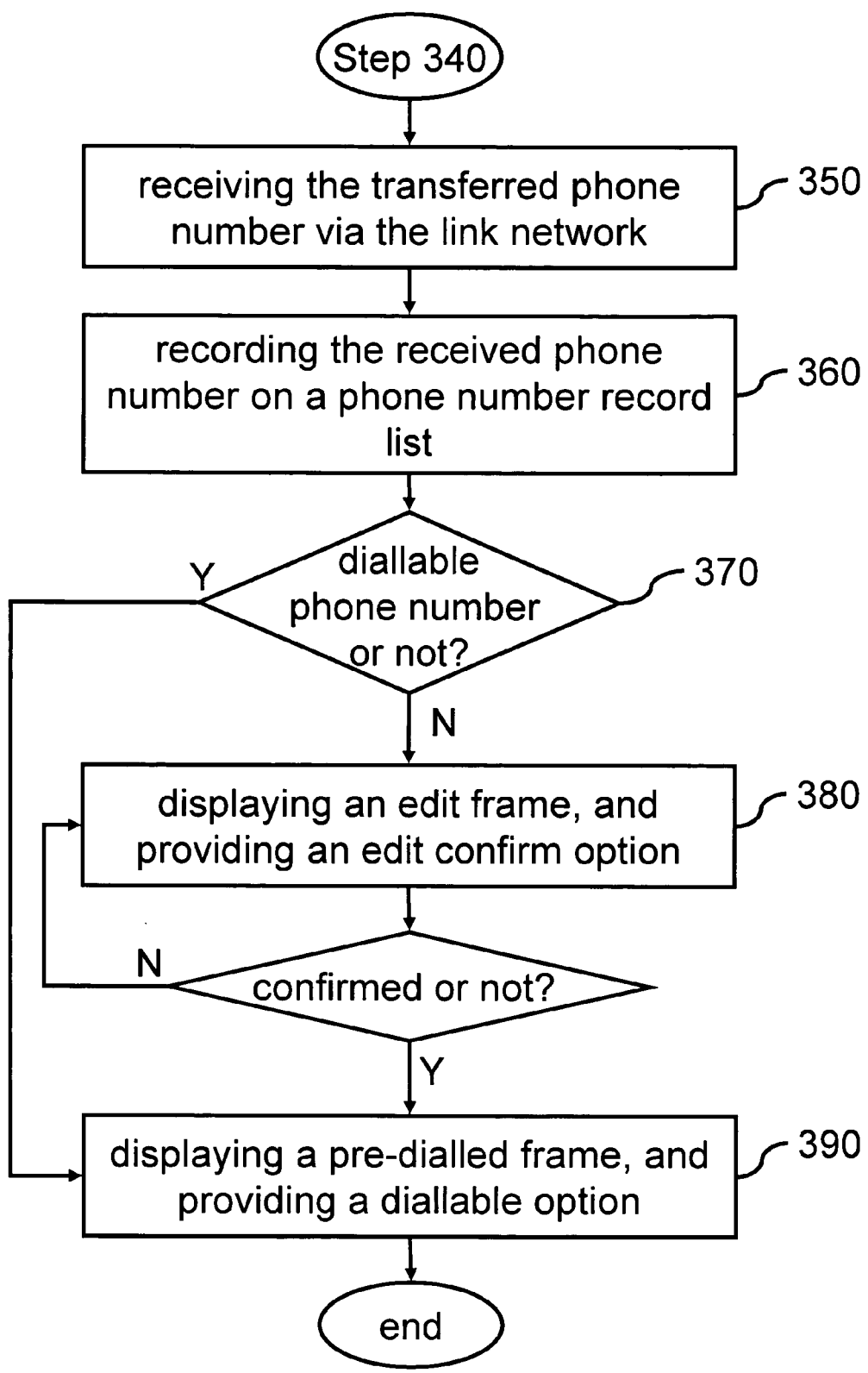
FIG. 4 is a flow chart for illustrating a method of acquiring a phone number via a link network according to an embodiment of the present invention.

In addition, referring to FIG. 4, after receiving the transferred phone numbers (Step 350), the second transceiver 250 records the received phone numbers on the phone number record list 240 (Step 360). At this time, the second determining part 270 will determine the properties of the received phone number, to obtain a expecting dial state of the phone number to provide a determined result, i.e. to confirm whether the number is diallable or not (Step 370). And the second controller 290 controls the displayed frame according to the determined result and provides the corresponding functions (e.g., dial or edit). In other words, when the second determining part 270 determines that the received phone number is an executive number (i.e. a diallable number), a pre-dialled frame is displayed on the display, and a dial option is also provided thereon for the user to confirm the dial (Step 390). Whereas, when the second determining part 270 determines that the received phone number is an inexecutive number (i.e. an undiallable number), an edit frame is displayed on the display, and an edit confirm option is also provided thereon (Step 380), for the user to edit the phone number and confirm the completion of the edit operation by the edit confirm option, wherein, after confirming, a pre-dialled frame is immediately displayed, as well as the dial option, for the user to confirm the dial (Step 390).

Herein, the second determining part 270 makes a comparison according to the identification numbers and the corresponding number counts, to find out whether the received phone number is an executive phone number (i.e. a diallable phone number) or not. Herein, according to the identification numbers and the corresponding number counts, a decision table may be created (as shown in Table 1 below), which is used for comparison while determining, wherein, the identification number can be 2 to 4 digits, for comparing with the first 2 to 4 digits of the received phone numbers, and the corresponding number counts depend upon the dial state of the communication device. For example, for an ordinary local phone number, when dialing with the communication devices, such as an indoor phone, it is unnecessary to dial the identifier of long distance dial and the area code. But when dialing with the communication devices, such as a mobile phone, the identifier of long distance dial and the area code are still needed.

TABLE 1

| identification number | number count |
|---|---|
| 02 | 10 |
| 03 | 9 |
| . | . |
| . | . |
| . | . |
| 0836 | 9 |
| 0800 | 10 |
| 091 | 10 |
| . | . |
| . | . |
| . | . |

Herein, the signal transceivers 130, 230 of the two communication devices 100, 200 are the link interfaces linked with each other by a transmission line; or the infrared modules linked with each other by infrared rays; or wireless transceiver modules (e.g., RF transceiver modules, bluetooth wireless transceiver modules, Wireless Local Area Network (WLAN) transceiver modules, or wireless transceiver modules of the same series as the 802.11x Standard instituted by International Electrical and Electronics Engineers Institute (IEEE) (e.g., 802.11a Standard, 802.11b Standard, 802.11g Standard, 802.11h Standard, 802.11i Standard, or the one containing more than two Standards of 802.11 series, etc.)) which can be linked with each other.

Figure 5:
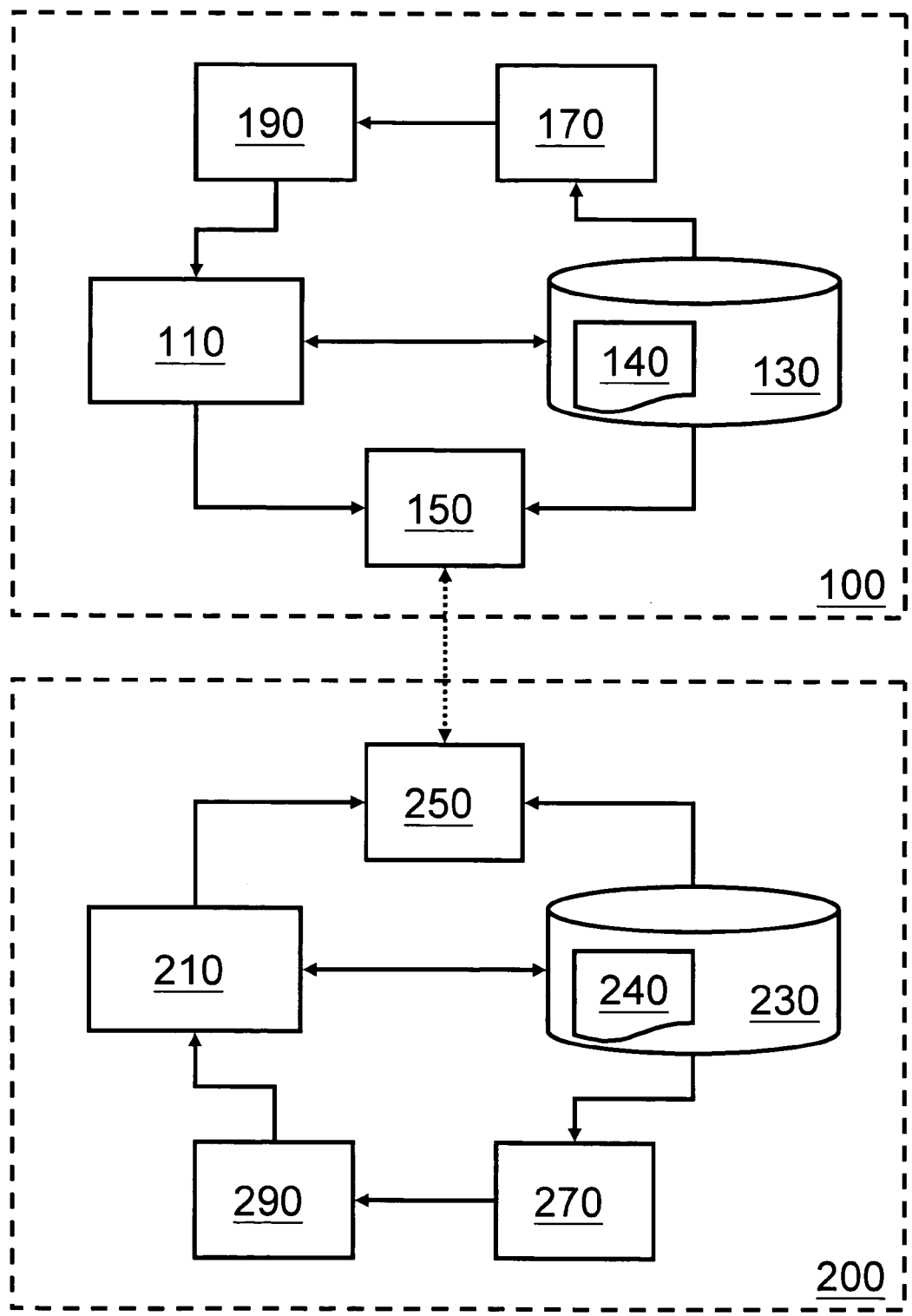
FIG. 5 is a general block diagram for illustrating a communication device for transmitting/acquiring a phone number via a link network according to still another embodiment of the present invention.

Additionally, the first communication device 100 can also comprise a first determining part 170 and a first controller 190. The first communication device 100 can be linked to the second communication device 200 by the signal transceiver, to receive one or more phone numbers from the second communication device 200. And the first determining part 170 determines properties of the phone number, to confirm whether the number can be dialed. Finally, the first controller 190 controls the displayed frame and the provided function (e.g., dial or edit) according to the determined results, as shown in FIG. 5.

It is illustrated below with reference to the examples. For convenience of illustration, supposing that the first communication device is a mobile phone, and the second communication device is an indoor phone, and their signal transceivers are infrared modules.

Herein, the phone number record list generally is the phone book of a mobile phone. The transfer function is selected after selecting the phone number recorded on the phone books. Meanwhile, the infrared module detects the linkable devices within the transfer scope. After selecting another indoor phone with the infrared module, the two infrared modules are linked to each other by infrared rays. At this time, a transfer confirm option is displayed on the mobile phone for the user to actuate the transferring process, after that, the selected phone number is transferred from the mobile phone to the indoor phone by infrared rays.

After receiving the phone number, the indoor phone records the received phone number on a phone number record list. Therefore, the user can select the number to be dialled on the display by simply control keys. And meanwhile, the determining part makes a comparison according to the identification numbers and the corresponding number counts. The dial or edit function is provided by the controller, according to the determined results of the determining part. According to this method, the most proper communication device can be effectively and conveniently selected, based on the requirement and expense consideration (e.g., half cost to make an internal call, or free to call each other via IP phones).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication device for acquiring a phone number via a link network, comprising:
    a signal transceiver for providing a link network and acquiring at least one phone number from an another communication device via the link network;
    a storage medium having a phone number record list for recording the phone number;
    a determining part for determining the phone number to be a diallable number or an undiallable number to obtain a expecting dial state of the phone number to provide a determined result; and
    a controller for selectively providing a dial function and an edit function of one of the phone number according to the determined result;
    wherein the determining part makes a comparison of the phone number according to a decision table to obtain the determined result, a plurality of identification numbers and a plurality of number counts according to the identification numbers are recorded on the decision table, and the identification number is one integral code from 2 to 4 digits, and the number counts depend upon the dial states of the communication device.

2. The communication device for acquiring a phone number via a link network of claim 1, wherein when the expecting dial state is determined to be a diallable phone number, the controller provides the dial function of the determined phone number.

3. The communication device for acquiring a phone number via a link network of claim 1, wherein when the expecting dial state is determined to be an undiallable phone number, the controller provides the edit function of the determined phone number.

4. The communication device for acquiring a phone number via a link network of claim 1, wherein the signal transceiver is an infrared module.

5. The communication device for acquiring a phone number via a link network of claim 1, wherein the signal transceiver is a wireless transceiver module.

6. The communication device for acquiring a phone number via a link network of claim 1, wherein the signal transceiver is a link interface.

7. The communication device for acquiring a phone number via a link network of claim 1, further comprising: a display for displaying a frame under the control of the controller.

8. The communication device for acquiring a phone number via a link network of claim 7, wherein when the controller provides the dial function, the frame is a pre-dial frame, and on the pre-dial frame, a dial option is provided; when the controller provides the edit function, the frame is an edit frame, on which an edit confirm option is provided.

9. A method of acquiring a phone number via a link network, suitable to be used in a communication device, comprising the following steps:
    receiving at least one phone number from an another communication device via a link network;
    recording the received phone number on a phone number record list; determining a property of one of the phone numbers to obtain a expecting dial state of the phone number to provide a determined result; and
    selectively providing a dial function and an edit function of the determined phone number according to the determined result;
    wherein selectively providing a dial function includes the steps of:
    when the expecting dial state is a diallable phone number, providing the dial function of the determined phone number and displaying a pre-dialled frame, on which a dial option is provided when the expecting dial state is the diallable phone number; and
    when the expecting dial state is an undiallable phone number, providing the edit function of the determined phone number.

10. The method of acquiring a phone number via a link network of claim 9, wherein the step of determining a property of one of the phone numbers to obtain a expecting dial state of the phone number to provide a determined result comprises the step of making a comparison of one of the phone numbers according to a decision table to obtain the determined result.

11. The method of acquiring a phone number via a link network of claim 10, wherein a plurality of identification numbers and a plurality of number counts according to the identification numbers are recorded on the decision table.

12. The method of acquiring a phone number via a link network of claim 11, wherein the identification number is one integral code from 2 to 4 digits, and the number counts depend upon a dial state of the communication device.

13. The method of acquiring a phone number via a link network of claim 9, wherein the step of when the expecting dial state is an undiallable phone number providing the edit function of the determined phone number comprises the step of displaying an edit frame, on which an edit confirm option is provided when the expecting dial state is the undiallable phone number.

14. The method of acquiring a phone number via a link network of claim 9, wherein the link network is formed by an infrared link.

15. The method of acquiring a phone number via a link network of claim 9, wherein the link network is formed by a wireless transceiver module.

16. The method of acquiring a phone number via a link network of claim 9, wherein the link network is formed by a transmission line.

* * * * *